United States Patent [19]

Gray

[11] Patent Number: 4,481,308

[45] Date of Patent: Nov. 6, 1984

[54] PRETREATMENT METHOD OF PRODUCING FIRE RETARDANT FOAM

[75] Inventor: Stanley D. Gray, Greensboro, N.C.

[73] Assignee: Anti-Fire Foam, Inc., Atlanta, Ga.

[21] Appl. No.: 491,308

[22] Filed: May 3, 1983

[51] Int. Cl.$^3$ .............................................. C08G 18/14
[52] U.S. Cl. ..................................... 521/120; 521/76;
521/128; 521/906; 521/917
[58] Field of Search ................. 521/128, 906, 917, 76,
521/120

[56] References Cited

U.S. PATENT DOCUMENTS

| | | | |
|---|---|---|---|
| 3,222,301 | 12/1965 | Dahm | 521/120 |
| 3,542,701 | 11/1970 | Van Raamsdonk | 521/120 |
| 3,717,597 | 2/1973 | Hesskamp et al. | 521/128 |
| 3,772,222 | 11/1973 | Steward et al. | 521/906 |
| 3,867,320 | 2/1975 | Gambardella et al. | 521/906 |
| 3,876,568 | 4/1975 | Wysocki | 521/120 |
| 4,234,695 | 11/1980 | Yukuta et al. | 521/128 |
| 4,246,361 | 1/1981 | Yukuta et al. | 521/128 |
| 4,311,802 | 1/1982 | Golser et al. | 521/917 |

FOREIGN PATENT DOCUMENTS 1406036  6/1965  France .

OTHER PUBLICATIONS

Lesco Products–Data Sheet on Sulfur Coated Urea, (Elyria, Ohio), Oct. 1981.

Primary Examiner—Herbert S. Cockeram
Attorney, Agent, or Firm—Patrick F. Henry

[57] ABSTRACT

A method for the production of fire retardant foam such as flexible polyurethane foam. The method includes the mixing of urea with one or more of the foam producing reactants prior to combining or at the time of combining such reactants to produce the foam material. In one embodiment, the urea is pre-mixed with the polyol reactant in a slurry apparatus. In another embodiment, urea is injected into a mixing head at the time of mixing the foam producing reactants. The urea component may be employed in amounts of about 30 to 45% by weight of the total foam mass composition.

18 Claims, 1 Drawing Figure

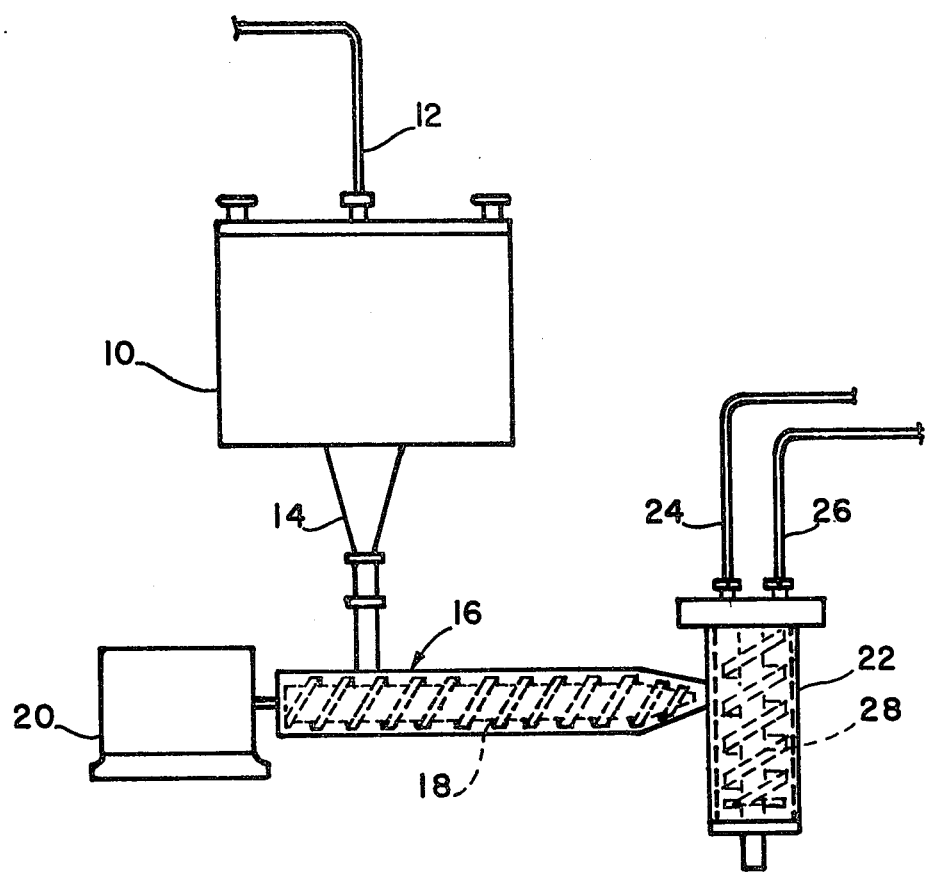

PRETREATMENT METHOD OF PRODUCING FIRE RETARDANT FOAM

BACKGROUND AND SUMMARY OF THE INVENTION

The present invention relates to a pretreatment method for the production of a fire retardant foam material. More particularly, the present invention relates to a pretreatment method in which solid particles of urea are mixed with one or more of the foam producing reactants prior to combining or at the time of combining such reactants to produce a fire retardant flexible polyurethane foam.

In the production of flexible polyurethane foam materials, a polyol such as polypropylene glycol is typically treated with a polyisocyanate in the presence of water and a catalyst. As the polymer forms, water reacts with the isocyanate groups to produce carbon dioxide which causes foaming. In some cases a blowing agent may be employed to produce the foaming effect.

In U.S. patent application Ser. No. 412,441 filed Aug. 27, 1982 there is described a method for production of fire retardant foam such as flexible or semi-flexible polyurethane foam in which various materials utilized to provide fire retardancy are incorporated after the foam mass is produced.

By the present invention, there is provided an improved method for the production of foam materials having a high degree of fire retardancy, utilizing a pretreatment method in which the materials utilized to promote fire retardancy are incorporated with the reactant materials prior to or during production of the foam mass, thus eliminating the necessity for a second operation. The present invention is an improvement upon current formulations and methods utilized in the foam industry, particularly the urethane industry, in which pretreatment methods are employed which include the use of halogenated phosphorus compounds, antimony oxide and alumina trihydrate. Such prior art formulations have been found to decrease the physical quality of the foam, produce questionable levels of fire retardancy and also to be very expensive to produce. The present invention, on the other hand, results in a highly fire retardant foam which can be produced at low cost and without impairing the physical qualities of the foam.

In one embodiment, the urea and the foam producing materials are mixed in a slurry apparatus whereby the urea is pre-mixed with the polyol component of the foam prior to the addition of the isocyanate. In an alternative embodiment, the urea is incorporated into the reacting mass of polyol and isocyanate in solid form at the mixing point, such as by injection into a mixing head with an endless screw conveyor. This latter method is particularly useful in a case where the polyols which are employed are primarily capped with ethylene oxide which tends to dissolve the urea to a point where it can not be processed through typical pumping and metering equipment such as are employed in the slurry method.

In the case where polyols which are primarily capped with ethylene oxide are employed, the urea component should be incorporated into the reacting mass in solid form at the mixing point. When an endless screw conveyor is used for this purpose, the urea enters the mixing chamber from the conveyor and is evenly dispersed in the foam mass. The screw conveyor may operate at speeds such as from 2500 to 9000 rpm. In this embodiment, the urea enters the screw chamber from a pressurized container which forces the urea into the chamber. The dispensing mechanism is synchronized by means of a solenoid valve that activates the screw at the same time that the reacting liquids are introduced into the mixing chamber.

In adding the urea to the foam producing materials, according to the invention, the urea component may be effectively employed in amounts of from about 30 to 45% by weight of the total foam mass composition, i.e., foam and urea. The minimum desirable level is about 30% by weight of urea and optimum fire retardancy was achieved by the use of about 40 to 45% by weight urea in the composition. Thus, for example, a foam mass prepared with 40% urea exhibited a Flame Spread Index level of less than 25 when treated in accordance with ASTM-E-162 Radiant Panel Test. The same foam mass with no urea yielded a Flame Spread Index of more than 1000. It has been found that the presence of urea in the foam mass does not appreciably affect either the tensile strength, tear value or compression set values of the foam.

BRIEF DESCRIPTION OF THE DRAWINGS

The FIGURE is a side elevation of a schematic representation showing one method for producing fire retardant foam materials in accordance with the present invention.

DESCRIPTION OF THE PREFERRED EMBODIMENTS

In the embodiment of the invention as shown in the FIGURE, there is provided a schematic representation showing a portion of one method for producing fire retardant foam material obtained by mixing urea with the foam producing reactants. The method of the FIGURE is particularly suitable when the polyols which are employed are primarily capped with ethylene oxide. In this embodiment, the urea component is provided in the form of granules within a pressurized container 10 with removable lid portion, having an incoming air line 12 to maintain the container 10 under the desired pressure such as about 20 psi. From the container 10, the urea passes under pressure through line 14 into a screw chamber 16. The screw chamber 16 is provided with a longitudinally extending endless screw conveyor member 18, of helical or other conventional configuration, operated by motor 20.

As shown in the FIGURE, the screw chamber 16 communicates with a mixing chamber 22 so that urea granules may enter the mixing chamber 22 where the foam producing reactants are combined. The polyol and polyisocyanate are admitted to the chamber 22 through inlet lines 24 and 26, respectively. A solenoid valve 28 is installed in the line 14 between container 10 and screw chamber 16. The valve 28 is connected with inlet lines 24 and 26 and controls the operation of the screw 18 so that urea passes into the mixing chamber 22 at the same time that the reacting liquids are introduced into the chamber 22. In this manner, the urea is evenly dispersed with the foam producing reactants in the mixing chamber 22 and a screw type conveyor 28 or other suitable means is employed within the chamber 22 to mix the components.

Regardless of the procedure utilized to incorporate the urea into the foaming mass, the formulation for the production of polyether slab foam should be adjusted, especially when the type of foam desired is of the conventional type. If the product being manufactured, however, is of the HR type where the primary capped polyol is being utilized, then alterations to the formulation are minimal; the increased kinetic activity of the urea does not interfere with the foaming reaction curve.

Among the available formulations are those which incorporate a chlorinated solvent such as methylene chloride and/or an inert, non-reacting plasticizer such as dioctyl phthalate (DOP) into the formulation to prevent undesirable side effects such as shrinkage, closed cells and splitting. Typical formulations following this approach are:

EXAMPLE I

| Component | Amount (parts by weight) |
|---|---|
| Polyol (3000 MW) Propylene Oxide initiated | 100 |
| Water | 4.2 |
| Stannous Octoate | .2 |
| Silicone surfactant | 1.0 |
| Methylene Chloride | 22.0 |
| Urea | 100.00 |
| Triethylene diamine | .1 |
| Tolylene Diisocyanate | 54.0 |

EXAMPLE II

| Component | Amount (parts by weight) |
|---|---|
| Polyol (3000 MW) Propylene Oxide initiated | 100 |
| Water | 4.2 |
| DOP | 10.0 |
| Stannous Octoate | .2 |
| Silicone Surfactant | 1.0 |
| Methylene Chloride | 15.0 |
| Urea | 100.0 |
| Amine Catalyst Polycat 12 | .2 |
| Tolylene Diisocyanate | 54.0 |

Generally the amount of chlorinated solvent employed is from 3% to 12% by weight of the total foam mass composition. The amount of plasticizer employed is from 1% to 12% by weight of the total foam mass composition.

An alternative method in the slurry foam embodiment is to introduce a high molecular weight ethylene oxide (EO) capped polyol containing primary hydroxyl groups, such as a 4500 MW triol (Mobay No. E-3901 is an example) replacing part of the 3000 MW polyol. This allows for better control of the reaction, but it creates a processing limitation in that long term exposure of the slurry method creates increased viscosity and impairs the metering and pumping operations. The high molecular weight polyol is generally employed in an amount of at least 40% by weight of the total polyol component.

A formulation that can be used for this method is the following:

EXAMPLE III

| Component | Amount (parts by weight) |
|---|---|
| Polyol (3000 MW) Propylene oxide initiated | 60 |
| Polyol (4500 MW) Primary capped with EO | 40 |
| Urea | 100 |

-continued

| Component | Amount (parts by weight) |
|---|---|
| Water | 4.2 |
| Silicone surfactant | 1.0 |
| Stannous Octoate | .2 |
| Amine catalyst Polycat 12 | .4 |
| Tolylene Diisocyanate | 54 |

The above formulations help to control the reactions so that large quantities of urea may be incorporated into the foam mass utilizing state of the art technology and equipment. Urea affects the initial aspects of the reaction by increasing foaming rate. It acts also as an endothermic agent in the later stages of the reaction thereby delaying gelation and polymer development.

An alternative approach to the production of flexible slabstock foam containing large quantities of urea is to utilize the catalytic activity of the urea and an external heat source to control the development of polymer strength. Thus, the following formulation illustrates this method:

| Component | Amount (parts by weight) |
|---|---|
| Polyol (3000 MW) | 100 |
| Urea | 100 |
| Water | 4.2 |
| Silicone Surfactant | 1.0 |
| Tolylene Diisocyanate | 54 |

Traces of stannous octoate (0.02) may be introduced.

Utilizing a heat source such as an oven that forces air at 200° F. on the expanding mass, foams can be produced without using the conventional amine catalysts.

In some cases it has been found that urea, being water soluble, will wash out of the foam mass to a certain extent when the foam material is utilized in an environment in which it is subjected to repeated water washings. To prevent this occurrence, the urea component may be coated with sulfur. The sulfur coating has been found to prevent the urea from dissolving in water, thus effectively maintaining the urea within the foam mass. Coatings of other materials such as shellac, stearic acid or vinyl materials may also be employed, although the use of sulfur is preferred as it has been found to be the most effective of the materials tested in this regard. A particular sulfur coated urea which may be employed is in the form of a time release fertilizer sold by AG Industries Mgf. Corp. of Columbia, Ala.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of producing a fire retardant flexible polyurethane foam material which comprises mixing urea with at least one of the foam producing reactants prior to combining or at the time of combining such reactants to produce the flexible polyurethane foam material.

2. The method of claim 1 wherein urea is pre-mixed with a polyol reactant in a slurry.

3. The method of claim 1 wherein urea is injected into a mixing head in the form of solid granules at the time of mixing the foam producing reactants in the mixing head.

4. The method of claim 1 wherein urea is employed in an amount of about 30 to 45% by weight of the total foam mass composition.

5. The method of claim 1 wherein urea is added in the form of solid granules.

6. The method of claim 1 wherein the foam material is polyurethane foam.

7. The fire retardant foam material produced by the method of claim 4.

8. The method of claim 3 which includes: (a) passing the urea in the form of solid granules into a screw chamber having a screw conveyor operating at 2500 to 9000 rpm; and (b) passing the urea from the screw chamber into the mixing head, the dispensing of the urea being synchronized with the dispensing of the foam producing reactants into the mixing head.

9. The method of claim 8 wherein a polyol is employed as a foam producing reactant, said polyol being primarily capped with ethylene oxide.

10. The method of claim 2 wherein said polyol includes a high molecular weight ethylene oxide capped polyol containing primary hydroxyl groups.

11. The method of claim 10 wherein said high molecular weight polyol is employed in an amount of at least 40 weight % of the total polyol reactant.

12. The method of claim 10 wherein said high molecular weight polyol has a molecular weight of about 4500.

13. The method of claim 1 wherein a chlorinated solvent is added to said mixture.

14. The method of claim 1 wherein a plasticizer is added to said mixture.

15. The method of claim 1 further including the step of heating the mixture of urea and foam producing reactants to form the foam material.

16. The method of claim 1 wherein said urea is coated with sulfur prior to mixing the urea with the foam producing reactants.

17. The fire retardant foam material produced by the method of claim 16.

18. The fire retardant flexible polyurethane foam material produced by the method of claim 3.

* * * * *